US012749092B1

(12) United States Patent
He et al.

(10) Patent No.: US 12,749,092 B1
(45) Date of Patent: Sep. 29, 2026

(54) MULTI-LEVEL MODEL ARCHITECTURE FOR CONTROLLING THE SIZE OF USER BEHAVIOR MODELS

(71) Applicant: Amazon Technologies, Inc., Seattle, WA (US)

(72) Inventors: Jinghai He, Berkeley, CA (US); Chuandong Zhou, Westminster, CO (US); Huawu Deng, Gatineau (CA); Pramod Varma, Boulder, CO (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 18/542,458

(22) Filed: Dec. 15, 2023

(51) Int. Cl.
*G06Q 30/0251* (2023.01)

(52) U.S. Cl.
CPC ................................ *G06Q 30/0254* (2013.01)

(58) Field of Classification Search
CPC .................................................. G06Q 30/0254
See application file for complete search history.

(56) References Cited

U.S. PATENT DOCUMENTS

| | | | | |
|---|---|---|---|---|
| 11,004,135 | B1 * | 5/2021 | Sandler | G06Q 30/0631 |
| 11,934,971 | B2 * | 3/2024 | Kotolyan | G06N 7/01 |
| 2017/0154356 | A1 * | 6/2017 | Trevisiol | G06Q 30/0277 |
| 2019/0114662 | A1 * | 4/2019 | Bennion | G06N 20/00 |
| 2021/0342740 | A1 * | 11/2021 | Xu | G06F 16/9535 |
| 2021/0398011 | A1 * | 12/2021 | Hsu | G06N 3/006 |
| 2022/0058695 | A1 * | 2/2022 | Chud | G06Q 30/0271 |
| 2022/0092472 | A1 | 3/2022 | Sharma | |
| 2022/0105624 | A1 | 4/2022 | Kalakrishnan et al. | |
| 2023/0082173 | A1 * | 3/2023 | Li | G06N 20/00 713/168 |

FOREIGN PATENT DOCUMENTS

| | | | | | |
|---|---|---|---|---|---|
| CN | 104992256 | B | * | 1/2019 | G06Q 10/067 |
| CN | 112100623 | A | * | 12/2020 | G06F 21/577 |

* cited by examiner

*Primary Examiner* — Patricia H Munson

(74) *Attorney, Agent, or Firm* — Robert C. Kowert; Kowert, Hood, Munyon, Rankin & Goetzel, P.C.

(57) ABSTRACT

Embodiments of a user behavior inference system are disclosed that uses a multi-level machine learning (MLML) model to make inferences about user behaviors. The MLML model is organized in multiple levels, where an upper level processes part of the model input to generate control parameters for a lower level, and the lower level processes another part of the model input according to the control parameters to generate inference results. In embodiments, the upper level receives a user feature vector of a user and the lower level receives a behavior feature vector of the user. In embodiments, the model is trained to output a propensity score of the user for acquiring an item, and an item feature vector is included in the model input. Advantageously, the multi-level model architecture reduces the overall size of the model and the amount of training time and data needed to achieve a desired model performance.

20 Claims, 8 Drawing Sheets

MULTI-LEVEL MODEL ARCHITECTURE FOR CONTROLLING THE SIZE OF USER BEHAVIOR MODELS

BACKGROUND

Digital advertising is a form of marketing and advertising which uses the Internet to deliver promotional marketing messages to consumers. In recent years, digital advertising has changed the way of interaction between the companies and their clients, bringing significant changes to how consumers make their purchasing decisions.

One of the challenges for advertisers is to programmatically "target" digital advertisements to the right audience. For example, machine learning models may be used to perform behavior modeling, to use the historical behavior of users (e.g. user actions observed via an online store) to select targeted groups of users who are particularly likely to take future action on the ads. However, the huge size of these models makes them impractical for many use cases. For example, advertisers with only limited compute resources are not able to deploy sufficiently large models for successful behavior targeting. As another example, a large behavior model cannot be adequately trained in a short time period or based on sparse training data. As a result, user behavior modeling is not commonly employed in settings where there is significant resource, time, or data constraints.

Figure 1:
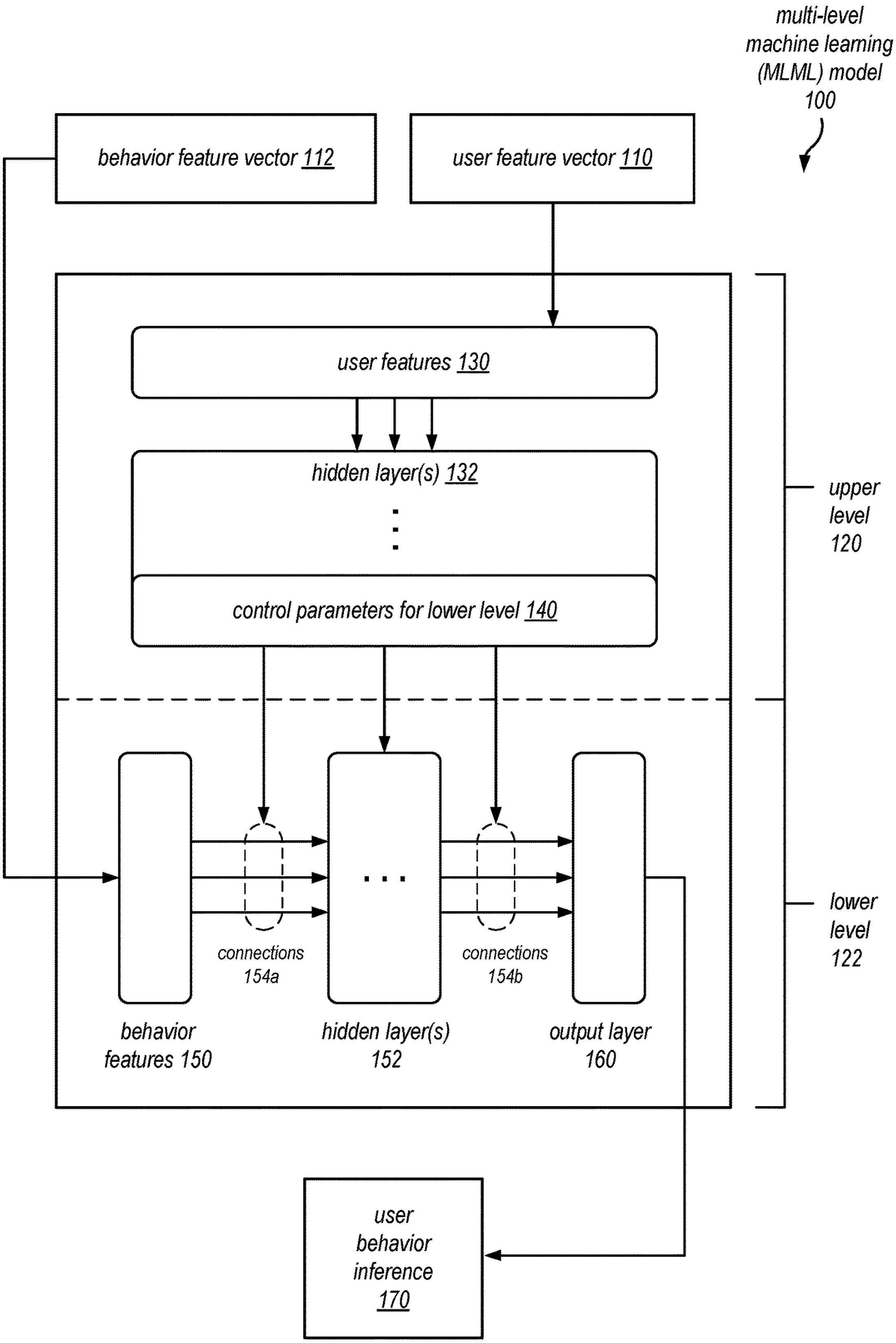
FIG. 1 is illustrating an embodiment of a multi-level machine learning (MLML) model for generating user behavior inferences that uses a multi-level architecture to reduce the size of the model, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Modern digital ad networks use machine learning models to programmatically "target" advertisements to the right audience based on historical user behaviors. For example, machine learning models may be used to analyze the historical behavior of users (e.g. user actions observed via an online store or previous ad conversions) to target ads to selected groups of users who are particularly likely to take future action on the ads. However, the huge size of current user behavior models makes them impractical for many use cases. For example, advertisers with a limited budget for compute resources or training time or only sparse training data are often not able to build large user behavior models that can meet performance requirements. The large size of these models is due in part to the large input feature vectors that the model must accept. For example, in a real-world ad network that services many advertisers, the input feature vectors included more than 60 million encoded parameters, which required a model size of 800M. Such a model is not a practical option for many advertisers, who do not wish to deploy the substantial amount of resources and data needed to train and maintain a model of that size.

To solve these and other problems in the state of the art, this disclosure describes a multi-level model architecture for user behavior models that reduces the model size, so that the model can be deployed using less compute resources and trained using less training time and data. In some embodiments, the disclosed techniques allow individual advertiser clients of an ad network to develop small, customized behavior models for individual ad campaigns. Based on studies performed by the inventors, multilevel models that employ the multi-level architecture can be trained to a comparable level of performance as baseline (larger) models that do not use the architecture, thereby providing a reasonable lower-cost alternative for advertisers who wish to implement user behavior modeling for audience targeting.

In some embodiments, the multi-level machine learning (MLML) model is decomposed into distinct levels, where an upper level (a meta-generator portion) receives part of the model inputs and a lower level (an inference portion) receives another part of the model inputs. In some embodiments, the upper level accepts a user feature vector of a user (e.g. gender, age group, income), and the lower level receives a behavior feature vector encoding a behavior sequence of the user, obtained with the user's permission. Depending on the embodiment, the MLML model may have more than two levels, and different model levels can be configured to accept different input feature vectors, which can include other types of feature vectors such as an item feature vector of an item (e.g. the subject of an ad), and an ad impression context feature vector that encodes attributes of the potential ad impression (e.g. user device, geographical location, time of day).

In some embodiments, the lower level is a propensity network trained to output a propensity score of the user for acquiring the item, which can then be used to make audience selection decisions (e.g. determine whether the user is placed in the target audience group for the ad). In some embodiments, the upper level is also a neural network trained to generate certain control parameters of the lower level. For example, the control parameters may include connection weights that are applied to the neuron-to-neuron connections in the lower-level network. Accordingly, the upper level acts as a controller of the lower level based on the upper-level inputs, but without processing the lower-level inputs. On the other hand, the lower level does not directly process the upper-level inputs, but is controlled by the control parameters from the upper level. Decomposition of the model in this manner dramatically reduces the overall size of the model (e.g. the number of neurons and connections) needed to perform an inference, without substantially sacrificing model performance. In some embodiments, the upper-level network is a one-hidden layer neural network that implements a rectified linear unit (ReLU) activation function, and the lower-level network is a two-hidden layer neural network that implements another ReLU activation function.

In some embodiments, the size of the MLML model can be further reduced by reducing the size of the behavior feature vector. To reduce the behavior feature vector, a smaller encoding model may be distilled from a baseline encoding model for encoding behavior sequences, to distill the sequence to only user actions that are associated with a subset of representative items, and drop the remainder of the actions. For example, the behavior vector may be distilled to only include actions associated with the top 1% of items that are most frequently observed. In one embodiment, the distillation step reduced the length of the action sequence to 1/100 of the previous length and enabled a further compression of the item embeddings in the behavior feature vector to 1/4 of the previous size, thus reducing the size of the behavior feature vector by a combined factor of 1/400.

In some embodiments, the MLML model may be trained in a piecemeal manner where only some levels in the model are trained during a particular training stage. For example, an online training process may be implemented to tune a lower level of the model based on actual feedback (e.g. conversion results) received during an ad campaign while keeping the upper level unchanged. This process may be used to enable a transfer learning process, where one portion of the model is specialized for a particular ad campaign while the other portions can be leveraged for more generalized use, thereby allowing the model to quickly adapt to the particular campaign based on only a limited amount of observation data.

In some embodiments, the model creation system may provide a configuration interface to allow the user to configure the multi-level architecture of the MLML model. For example, a graphical user interface may be provided to allow the user to specify whether to employ the multi-level model architecture, select the number of levels to use, assign input feature vectors to the model levels, and specify the ordering of the levels. In some embodiments, the configuration interface may indicate cost estimates for a given model architecture (e.g. estimated model size, training time, training data) and cost reductions that can be achieved through variations of the architecture. In some embodiments, the configuration interface may recommend to the user a particular configuration of the multi-level architecture based on a set of model cost constraints.

As may be understood by those skilled in the art, embodiments of the model management system described herein are specialized computer systems that implement improvements to the functioning of current computer systems that deliver digital ads to user devices. The disclosed system implements a practical application to, among other things, programmatically identify target audiences for ads based on observed user data. The multi-level model architecture described herein improves the functioning of current computer systems for implementing user behavior models to, among other things, reduce the overall size of the model, reduce the amount of time and data needed to train the models, reduce the amount of compute, memory, and storage resources needed to execute the models, and enable transfer learning processes to tune different model sections separately. Moreover, the machine learning models described herein can only be trained and executed through the use of computers, and the inference tasks performed by these models are not practically performed without using computers, for example, within the human mind and using pen and paper alone. The inventions of this disclosure are practical applications of computer systems to achieve technical benefits in the functioning of the computer. The inventions of this case are not directed to abstract subject matter outside of the computer realm, such as human mental processes, methods of organizing human activity, mathematical formulae or relationships, business or economic practices, or any other type of exceptions of patent-eligible subject matter recognized by the courts. Additional details and technical advantages of the disclosed inventions are described in further below, in connection with the figures.

FIG. 1 is illustrating an embodiment of a multi-level machine learning (MLML) model 100 for generating user behavior inferences that uses a multi-level architecture to reduce the size of the model, according to some embodiments.

As shown, the MLML model 100 in this example is divided into an upper-level portion 120 and a lower-level 122. However, some embodiments of the MLML model 100 may include more than two levels. In some embodiments, the MLML model 100 may be a deep neural network, and the two levels 120 and 122 may correspond to distinct groups of layers in the neural network. In other embodiments, the MLML model 100 may comprise other types of machine learning models, such as tree-based model, etc. In some embodiments, the upper level and lower level may comprise two different types of machine learning models.

As shown, in this example, the input to the MLML model 100 includes two feature vectors. The user feature vector 110 encodes features of a user, and the behavior feature vector 112 encodes a sequence of behaviors or actions of the user. In some embodiments, the behavior feature vector 112 is a fixed length vector. In other embodiments, the behavior feature vector 112 may be a variable length vector whose length varies based on the number of actions encoded. In some embodiments, the lower level 122 may be configured to accept variable length input, for example a recurrent neural network.

As shown, during execution of the model 100, the user feature vector 110 is consumed as input by the upper level 120, which creates an initial state of user features 130 encoded by the user feature vector 110. The user features 130 are then transformed through a number of hidden layer(s) 132 or hidden states within the upper level 120, and output via a last hidden layer as a set of control parameters 140 for the lower level. Notably, the upper level 120 receives only part of the input to the model (user feature vector 110), and does not receive or process the other part of the input (behavior feature vector 112) needed for the inference task.

As shown in this example, the control parameters 140 may include connection weights that are applied to the unit-to-unit connections 154*a* and 154*b* in the lower level 122. In other embodiments, the control parameters 140 control other elements of the lower level, such as individual neuron units or tree nodes within lower level 122.

As shown, the lower level 122 receives the behavior feature vector 112. The incoming behavior feature vector 112 may be initially created as a set of behavior features 150 in the lower level (e.g. in an input layer of lower level). The behavior features 150 are then processed through a set of hidden layer(s) 152 of the lower level, to output a user behavior inference 170 via an output layer 160, which is the output layer of the overall MLML model 100. In some embodiments, the behavior input may comprise a sequence of multiple behavior feature vectors 112 that are processed in series by the lower level, in a manner so that earlier behaviors in the series are remembered by the lower level and influences the processing of later behaviors. Notably, the lower level 122 processes only the behavior feature vector 112 portion of the input without directly receiving or processing the user feature vector 110. The user feature vector 110 only impacts the lower level through control signals (e.g. control parameters 140) generated by the upper level.

As may be appreciated by those skilled in the art, this multi-level architecture implements a type of a meta-learning system, where the upper-level model 120 is a meta-generator model that is trained to generate control signals for controlling the lower-level model 122. Intuitively, separation of the two input vectors in this context will not cause excessive degradation of the model's performance, because the two sets of inputs are likely to have relatively independent contributions on the ultimate output 170. In other words, the two sets of inputs are expected to have little cross-over influences on one another during the computation of the output. However, by separating the two input feature vectors into two distinct levels, the amount of computational units and unit connections 154 needed to generate the output can be drastically reduced. In one embodiment, the MLML model 100 used just one-hidden layer neural network with a first ReLU activation function to implement the upper-level portion and a two-hidden layer neural network with a second ReLU activation function to implement the lower-level portion, and this model was trained to attain an inference performance level that was approximately equal to a much larger baseline model that did not use the multi-level architecture. Advantageously, due to the significant reduction in the size of the model, successful training of the model was achieved using less time, less training data, and less training resources.

In terms of model training, depending on the embodiment, individual levels of the MLML model 100 may be trained together (e.g. both levels updated by backpropagation) or separately (e.g. only one level updated by backpropagation). The training may be performed according to one or more supervised training techniques using labeled training data. In some embodiments, different training datasets may be used for the upper and lower levels. In some embodiments, a transfer learning process may be performed to adapt a previously trained instance of the model 100 to a different inference task. For example, the transfer learning process may retain a trained upper level of the model and retrain the lower level for the new task.

Figure 2:
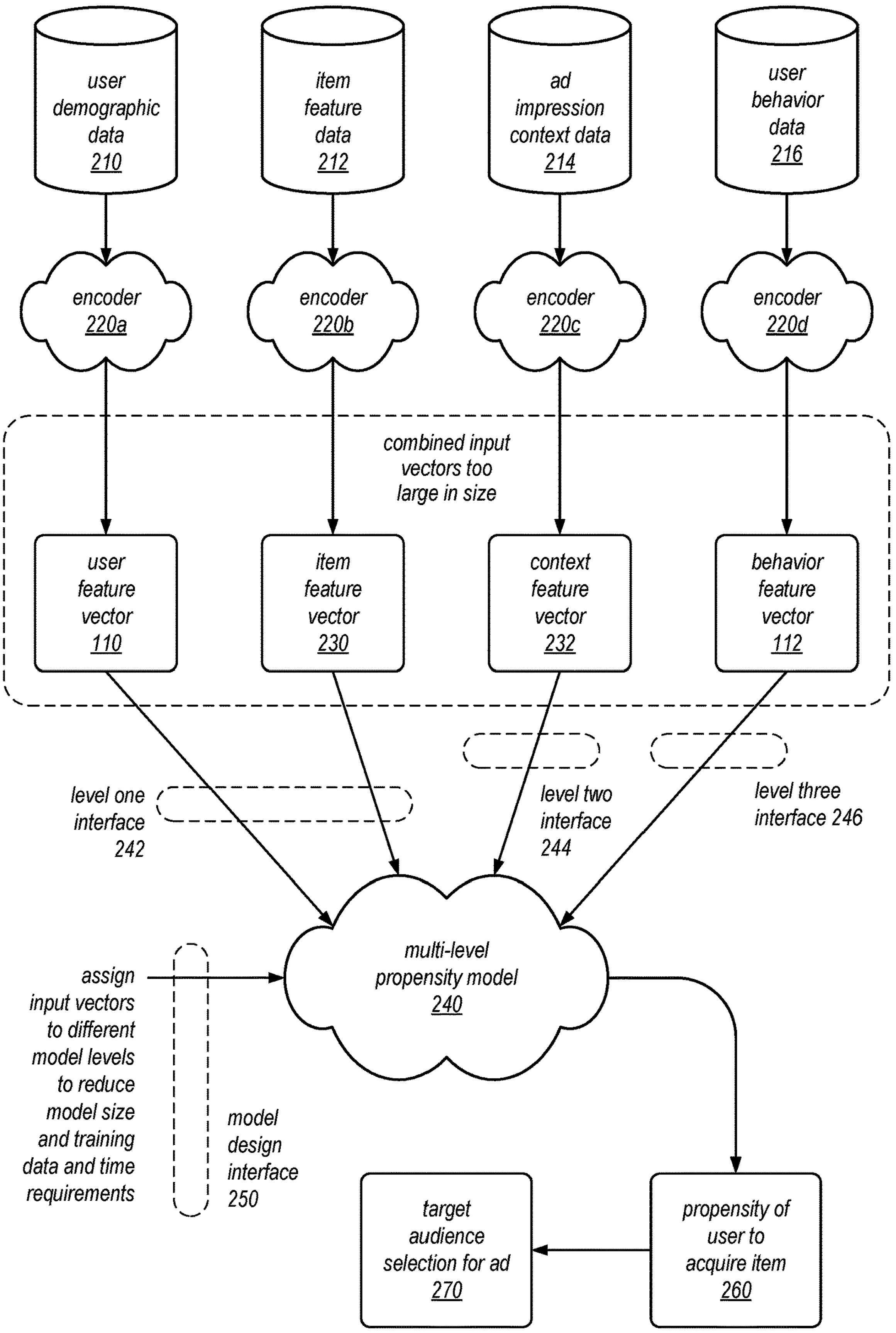
FIG. 2 illustrates an embodiment of a user behavior inference system that uses a MLML model that accepts input feature vectors through multiple input interfaces for different levels of the model, according to some embodiments.

FIG. 2 illustrates an embodiment of a user behavior inference system that uses a MLML model 240 that accepts input feature vectors through multiple input interfaces for different levels of the model, according to some embodiments. The multi-level propensity model 240 in the figure is an embodiment of the MLML model 100 of FIG. 1.

As shown, the propensity model 240 in this example is trained to output a propensity score 260 of a user for acquiring a particular item (e.g. an item being advertised) under a given set of input conditions. Inputs to the model 240 include the user feature vector 110, the behavior feature vector 112, as well as an item feature vector 230 and a context feature vector 232. As shown, these feature vectors are generated by respective encoding or embedding models 220*a-d*, which may be trained using machine learning techniques to generate vectors imbued with salient signals for model inference tasks. The data used to generate the feature vectors may be stored in respective data stores or databases, including a user demographic data store 210, an item feature data store 212, an ad impression context data store 214, and a user behavior data store 216. In some embodiments, the user behavior inference system may be implemented by an ad network, and the data stores may be maintained and populated by the ad network for various purposes.

In some embodiments, the user demographic data 210 includes user-level features that may influence the user's propensity to acquire (e.g. purchase) a given item (e.g. a product). Possible user-level features include attributes such as a user's age, gender, income, location, and categorical or statistical data indicating the user's past browsing or shopping patterns (e.g. whether the user has purchased something recently), etc. The users may be grouped into user categories, classifications, or segments defined by an advertiser or the ad network, and such information may also be included as user-level features.

In some embodiments, the item feature data 212 encodes an item's properties that may influence the propensity of users to acquire the item. Possible item-level features may include an item's brand, price, durability, color, size, etc. Products may be grouped into product categories, and the product category information may be included in the product-level information. In one embodiment, the item embedding is generated by a model designed to predict view-to-purchase behavior of products, and each product is represented with a 128 real-number vector of features. The vector incorporates information regarding the product's identifier and a number of attribute-value pairs, including the product's title, brand, descriptive information, price information, review information, and others. In some embodiments, a product embedding includes a purchase embedding and a view embedding, each of which is a 64-dimensional real-number vector.

In some embodiments, the user behavior data 216 indicates sequences of observed behaviors associated with individual users. The user behavior data may be collected by the ad network or from user interactions with a product catalog (e.g. an online store). In one embodiment, the behavior data is represented as a sequence of action-item pairs. The action is of an action type such as 'view', 'purchase', 'add to cart', etc. The item identifiers in the action-item pair are represented numerically, which can be used to encode hidden relations between the items and actions. These numerical representations (or event features) may be used to encode the information of a user's historical behavior. However, one issue regarding the representation of is that the size of model needed to generate the representation is too large. Thus, in some embodiments, a smaller model is used to generate custom user behavior vectors, which will be discussed in connection with FIG. 3.

In some embodiments, the ad impression context data 214 includes data captured by the ad network as the network interfaces with consumers and consumer engagement systems. In some embodiments, a consumer engagement system (e.g. a user device) that is part of the ad network will generate an ad request when it is ready to receive an ad impression, and the ad request will indicate the context data associated with the ad impression. The ad impression context data may include information such a time of the ad impression, a type of a user device associated with the ad impression, a location of the user device at the time of the ad impression, a content category or webpage used to deliver the ad impression, a placement of the ad impression within a content or webpage, a media type of the ad impression, or a user action related to a previous ad impression, etc.

As shown in the figure, when these input feature vectors are used to power the inference model, their combined size may be too large. That is, the combined size of the input feature vectors will cause the propensity model 240 to become extremely large, requiring unacceptably large amounts of resources for model training and maintenance. Accordingly, the multi-level architecture is used to separate the model 240 into three distinct levels in order to reduce the size of the model. In this example, a first level consumes the user and item feature vectors via a level one interface 242. The first level may then generate the control or operating parameters for a second level, which consumes the context feature vector via a level two interface 244. The second level may in turn generate control or operating parameters for a third level, which consumes the behavior feature vector via a level three interface 246.

In this example, the specific design of the multi-level architecture is configured via a model design interface 250, which allows a user to assign the input vectors to different model levels and specify the number and/or ordering of the levels, in order to reduce the size and training requirements of the model. The architectural design of the model may take into account various considerations such as the degree of crossover relationships between the various input feature sets, the nature and relative sizes of the input feature sets, and the resource or budget constraints associated with the model. For example, it may be determined that the user demographic data and item data are highly related in performing the inference task, so these two feature vectors are processed together in a single model level. On the other hand, the ad impression context data may have relatively little relationship with the other feature sets during the inference process, so that feature set can be assigned to a separate model level to further reduce the model size. Finally, the behavior feature vector may be assigned to the last level of the model because it is expected to be the largest of all input feature vectors.

As shown in this example, the propensity output 260 generated by the model 240 is used to make audience targeting decisions 270 for delivering ad impressions. For example, when an ad server in the ad network receives an ad request, the ad server may use the propensity model 240 to select an ad for the request that has the best highest propensity score. In some embodiments where the targeting decision is not dependent on the ad impression context information, target audiences for a particular ad campaign may be pre-selected in an offline process based on just the user demographic data 210, item feature data 212, and user behavior data 216.

Figure 3:
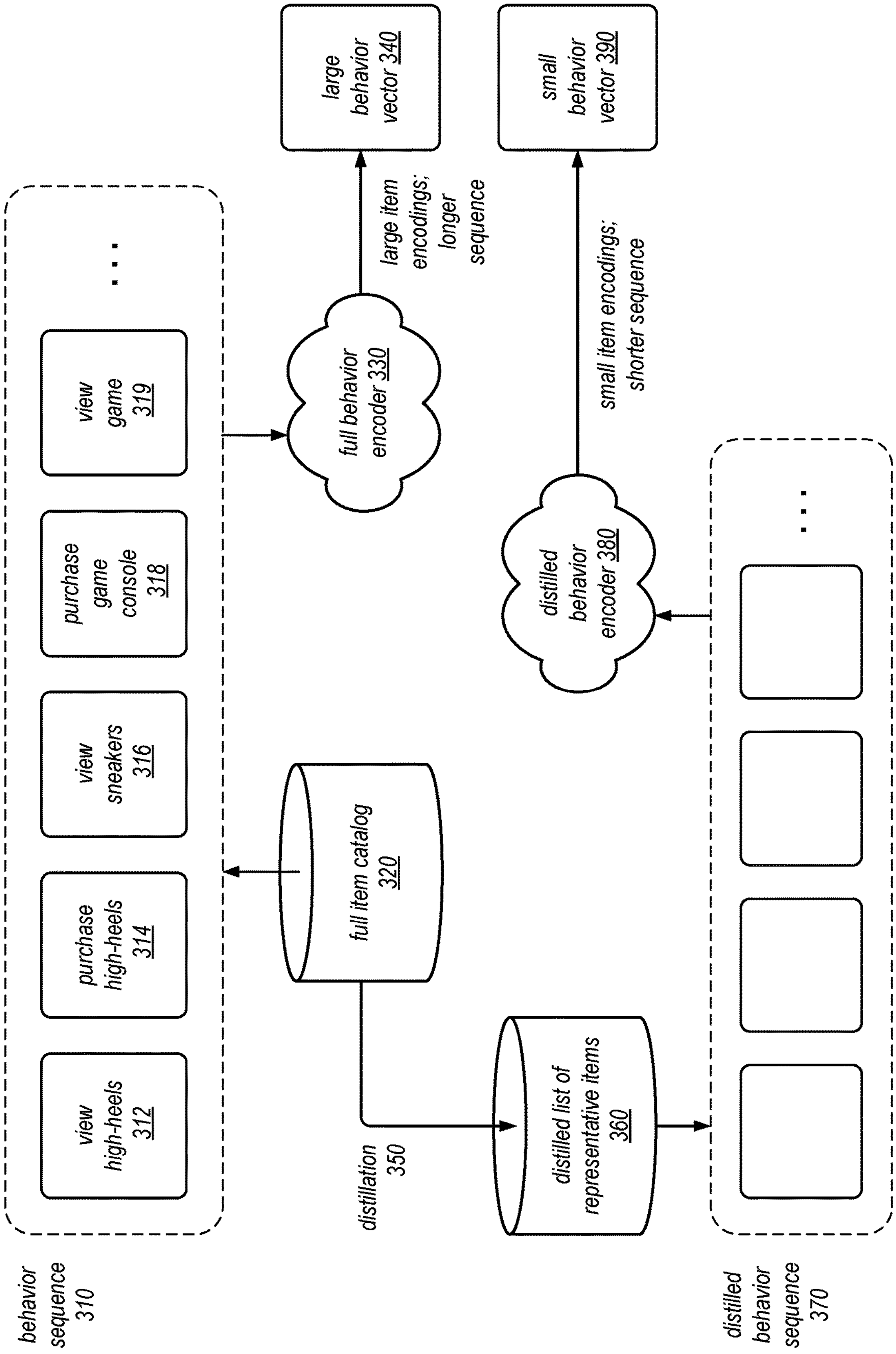
FIG. 3 illustrates a distillation technique to reduce the encoding size of a user behavior sequence for use by the MLML model, according to some embodiments.

FIG. 3 illustrates a distillation technique to reduce the encoding size of a user behavior sequence (e.g. the vector size of behavior feature vector 112) for use by the MLML model, according to some embodiments.

The top portion of the figure depicts an encoding process of using a baseline encoding model (full behavior model 330) to generate a large behavior vector 340, without using the distillation process 350. In this process, the model 330 encodes the full behavior sequence 330 of a user that includes user actions for all items in a full item catalog 320. For example, the action sequence may include action-item pairs such as view high-heels 312, purchase high-heels 314, view sneakers 316, purchase game console 318, and view game 319.

In some embodiments, each action-item pair in the sequence 310 includes an encoding or representation of the individual item, which is model-generated to indicate information about similarity or dissimilarity between different items. For example, the feature vector of two similar items such as high-heels and sneakers may be represented by real number vectors that are separated by a relatively small distance in the feature space, while dissimilar items such as high-heels and a game console will have a larger distance. The behavior encoder model 330 then summarizes the historical user events based on the item representations into a behavior vector 340 of values of the same dimension of items.

However, in many cases, the large behavior vector 340 is too large for consumption by a smaller model such as the propensity model 240, which may be a customized model for an individual advertiser or even a single ad campaign. The majority size of the behavior vector 340 can be attributed to its vectorized embedding of each item. The vector's size grows linearly with the representation size of the items it incorporates. Thus, to reduce the size of the behavior feature vector 340, a distillation process 350 is used to extract a list of representative items 360 from the full item catalog 320 to construct a distilled behavior sequence 370 that drops user actions associated with items not in the representative item list 360, as shown in the bottom portion of the figure. A smaller, distilled behavior encoder model 380 can then be used to encode the distilled sequence 370 to generate a smaller behavior vector 390 for the propensity model. In some embodiments, the distilled behavior encoder 380 may be implemented as a modification of or an add-on model to the full behavior encoder 330.

To select the representative items 360 for the distilled model 380, the distillation process 350 may select a set of "top" products that are purchased or viewed the most frequently based on historical statistics. The main logic behind this choice is that such products tend to be the most well-known and most reflective of global user behaviors, as opposed to lesser-known products that are more affected by noise. However, in some embodiments, the exact manner of the distillation 350 may be user configurable, so that an individual advertiser can select a specific set of products that are the most relevant to the advertiser's ad campaign. In some embodiments, the distillation process 350 may employ a randomized selection of items.

In one study using real-world data associated with an actual ad network, the distillation technique was evaluated for different sizes of the representative item list 360, using the most frequently observed 2000, 5000, 10000, and 20000 items to construct the distilled behavior vector 390. The following tables indicate the evaluation results of the propensity model observed for the different sizes:

| Representative Items | Average Recall | Average AUC | Average Precision | Recall @ Top 10% | Recall @ Top 20% | Recall @ Top 30% |
|---|---|---|---|---|---|---|
| no distillation | 21.17% | 0.66 | 31.44% | 23.27% | 35.74% | 50.73% |
| top 2 K items | 5.04% | 0.34 | 4.67% | 5.51% | 11.71% | 18.54% |
| top 5 K items | 8.70% | 0.45 | 14.83% | 9.61% | 18.25% | 26.47% |
| top 10 K items | 21.94% | 0.66 | 34.68% | 23.30% | 37.83% | 49.67% |
| top 20 K items | 19.44% | 0.61 | 37.74% | 20.59% | 34.29% | 44.68% |
| top 50 K items | 24.10% | 0.72 | 41.54% | 25.45% | 40.14% | 57.68% |

| Representative Items | Average Accuracy | Model Size vs. Baseline |
|---|---|---|
| no distillation | 100.00% | 0.66% |
| top 2K items | 42.13% | 0.31% |
| top 5K items | 57.24% | 0.57% |
| top 10K items | 88.67% | 1.12% |
| top 20K items | 91.19% | 2.14% |

As shown, the above results indicate that using a subset of the most representative items to describe user actions can have only insignificant influence on the model performance, especially when a meaningfully large number of representative items are used. Moreover, with only 1% of the full item catalog used as representative items, the distillation process was able to reduce the behavior sequence for the propensity model to 1/100 of its previous length, and enabled a further compression of the item representations in the sequence by 1/4 using a linear projection method. The combination of these effects reduced the overall size of the behavior feature vector 390 to just 1/400 of its previous size.

Figure 4:
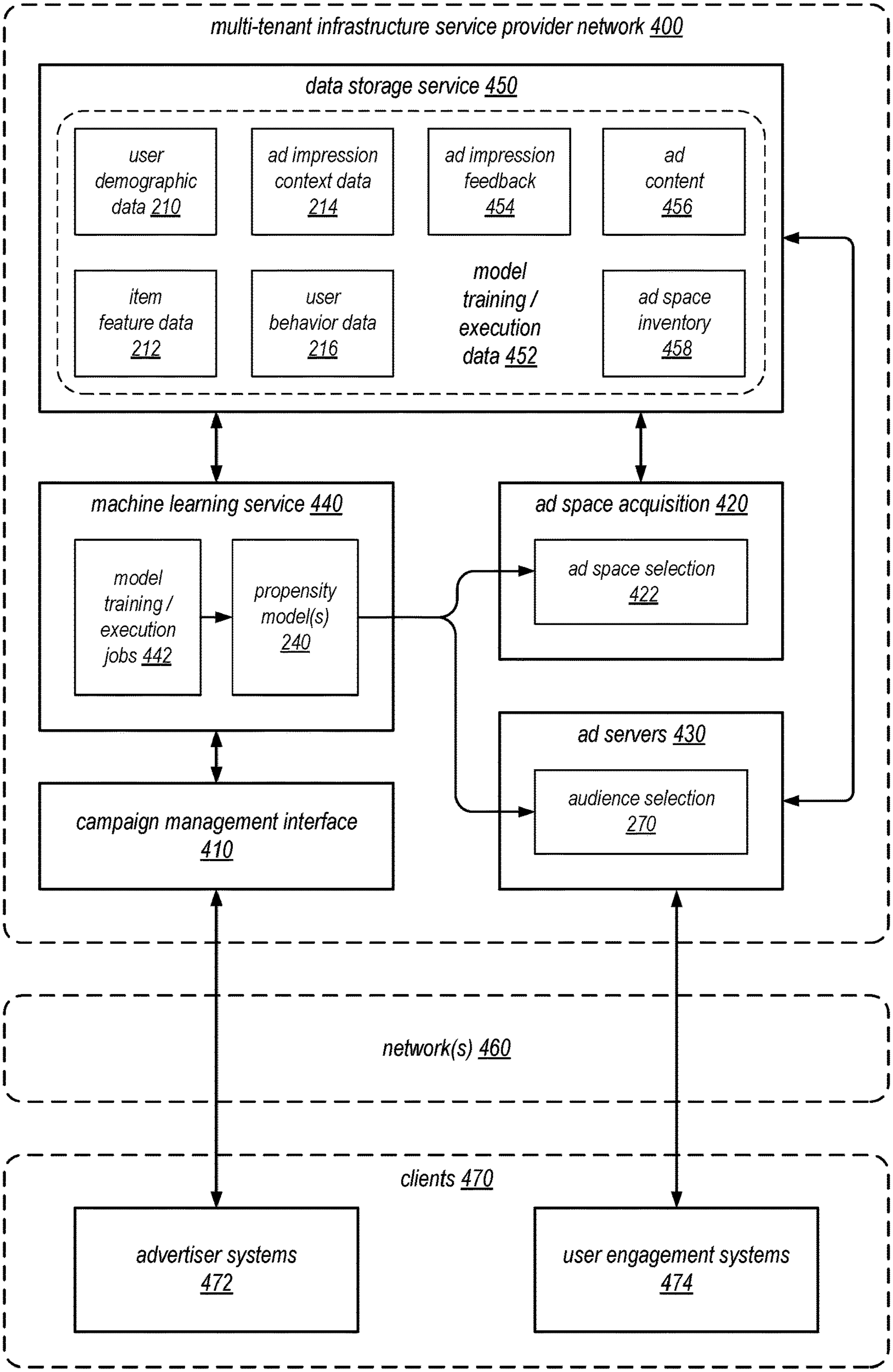
FIG. 4 illustrates an ad network implemented in a multi-tenant infrastructure service provider network that uses MLML models for behavior modeling, according to some embodiments.

FIG. 4 illustrates an ad network implemented in a multi-tenant infrastructure service provider network 400 that uses MLML models (e.g. propensity models 240) for behavior modeling, according to some embodiments.

The multi-tenant infrastructure service provider network 400 may be a private or closed system or may be set up by an entity such as a company or a public sector organization to provide one or more computing infrastructure services (such as various types of cloud-based storage) accessible via the Internet and/or other networks to clients 470 in client premises networks, in some embodiments. Service provider network 400 may be implemented in a single location or may include numerous data centers hosting various resource pools, such as collections of physical and/or virtualized computer servers, storage devices, networking equipment and the like, needed to implement and distribute the infrastructure and services offered by the provider network 400. In some embodiments, provider network 400 may implement various computing systems, resources, or services, such as a virtual private cloud (VPC) service, one or more compute service(s), data storage service(s) 450, machine learning service 440, as well as other types of services. As shown in this example, the services of the provider network are used to implement components of an ad network that delivers ad impressions on behalf of advertiser systems 472 to consumer engagement systems 474 via a fleet of ad servers 430.

In various embodiments, the components illustrated in the figure may be implemented directly within computer hardware, as instructions directly or indirectly executable by computer hardware (e.g., a microprocessor or computer system), or using a combination of these techniques. For example, the ad servers 430 may be implemented by a computer system that provides a number of computing nodes (or simply, nodes). In various embodiments, the functionality of a given system or service component may be implemented by a particular node or may be distributed across several nodes. In some embodiments, a given node may implement the functionality of more than one service system component (e.g., more than one data store component).

The compute service(s) implemented by service provider network 400 offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions of service provider network 400 in different embodiments, including general purpose or special purpose computer servers, storage devices, network devices and the like.

As shown, the ad servers 430 may be programmed to implement the audience selection functionality 270 based on the propensity scores generated by the propensity models 240. This selection 270 may be performed during the servicing of individual ad requests from user engagement systems 474, or in an offline process prior to the servicing of ad requests. For example, the audience selection may occur in response to a single ad request, to select the best ad to deliver for the request. As another example, the audience selection may pre-identify a group of users as the target audience for an ad campaign, before any ad impression context data is received. In some embodiments, the propensity scores generated by the propensity models 240 may be stored as user data (e.g. an advertiser specific data store), so that the best users can be selected based on standard database querying interfaces such as SQL. In some embodiments, the user data and other data stored in the data storage service 450 may be refreshed based on ongoing data collection processes implemented by the ad network, and the user propensity scores may be updated on a periodic basis based on the refreshed data.

To implement the VPC service, the service provider network 200 provides a physical or substrate network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the service provider network, for example it may not be possible to route from a substrate network address to an address in a production network that runs services of the service provider, or to a customer network that hosts customer resources.

The VPC service may implement one or more client networks as overlay networks of virtualized computing resources (e.g., compute instances provided by the compute service(s), block store volumes, data objects such as snapshots and machine images, file storage, databases provided by the database or data storage service(s) 450) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service may be used to coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, the data storage service 450 may be implemented using various types of data storage and processing systems to provide general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, the data storage service 450 may implement various types of databases (e.g., relational, NoSQL, document, or graph databases) for storing, querying, and updating data. Such services may be enterprise-class database systems that are scalable and extensible. Queries may be directed to a database in data store service 450 that is distributed across multiple physical resources, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via APIs. In other embodiments, external applications and programs may submit queries using Open Database Connectivity (ODBC) and/or Java Database Connectivity (JDBC) driver interfaces to the database system.

As shown in this example, the data storage service 450 is used to house different types of data including the user demographic data 210, item feature data 212, ad impression context data 214, user behavior data 216, ad impression feedback data 454 (e.g. actual conversion results), ad content and associated metadata 456, and ad space inventory 458. All of such data may be used as model training and/or execution input data 452 for the propensity models 240 or other types of machine learning models used by the ad network. In some embodiments, the data stored in the data storage service 450 are protected via appropriate access control mechanisms, for example, so that one advertiser client cannot access the data of another advertiser client without proper authorization.

In some embodiments, the machine learning service 440 may be used to manage the propensity models 240 of the ad network. The machine learning service 440 may be capable of performing a variety of machine learning tasks for different tenants using the resources of the service provider network 400, such as preparing ML data, configuring, training, and hosting various types of ML models, performing ongoing model management such as periodic evaluation and retraining, among other tasks. The machine learning service 440 may offer a variety of tools for developing and monitoring ML models, such as tools to monitor the performance of a ML model and/or interpretation and explanatory tools to explain why a ML model made certain decisions. In some embodiments, the machine learning service 440 will be used to maintain custom propensity models 240 for different advertiser clients or even individual advertising campaigns. As shown, these models may be executed and trained according to client-specified model training or execution jobs 442, which may be specified in a service-defined language. In some embodiments, management of the propensity models 240 may be associated with certain usage or resource charges, which will be assessed to the advertiser when the models 240 are trained or used to make audience targeting decisions. As discussed, the multi-level architecture described in this disclosure may be used to reduce the size and resource usage of the propensity models 240, so that the usage costs assessed by the machine learning service 440 can be dramatically reduced and/or easily controlled.

As shown, in some embodiments, the ad network may implement an ad space acquisition service 420, which allows advertisers to select 442 and acquire digital ad space inventory (e.g. ad display slots) for their ad campaigns, for example, via the campaign management interface 410. In some embodiments, the ad space inventory 458 may be submitted by content publishers (e.g. website owners, game developers) via a supply side platform (SSP) interface. This ad space inventory can then be presented to advertisers via a demand side platform (DSP) interface to allow advertisers to bid for and acquire the inventory, for example, as part of an auction process. In some embodiments, the DSP interface may use propensity scores generated by the propensity models 240 to present the inventory on the DSP interface, for example, to set an asking price for a particular ad space or recommend an ad space to a particular campaign. An ad space that is associated with high propensity scores for many advertisers may be priced higher to reflect its higher value. In some embodiments, the ad space acquisition service 420 may implement an automated matching process to match advertisers to the right ad space inventory, and the propensity scores generated by the model 240 may be used as the basis for such matching.

As shown, in some embodiments, the ad network may provide an ad campaign management interface 410 to advertisers, which may include the DSP interface as discussed. The campaign management interface 410 may be implemented as a graphical user interface or a web-based interface designed to be displayed via web browsers. The campaign management interface 410 may allow an advertiser to perform a variety of management tasks related to an ad campaign including acquiring ad inventory, uploading ad content 456, controlling audience targeting, and monitoring ongoing campaign performance and costs. In some embodiments, the campaign management interface 410 will allow advertisers to control the architectural and training parameters of the propensity models 240 used to make audience selection decisions 270.

Generally speaking, the clients 470 may encompass any type of client configurable to submit network-based requests to service provider network 400 via network 460. For example, a given client device may include a suitable version of a web browser, or may include a plug-in module or other type of code module that may execute as an extension to or within an execution environment provided by a web browser. Alternatively, a client 470 may encompass an application such as a database application (or user interface thereof), a media application, an office application or any other application that may make use of resources in in service provider network 400 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. As shown, the clients 470 in this example includes advertiser systems 472 associated with advertisers and various consumer engagement systems 474 associated with users, which comprise the ad delivery endpoints of the ad network. User engagement systems 474 may include a variety of computer systems such as web servers, online shopping portals, video or audio content delivery systems, user devices such as smartphones or smart TVs, voice assistants, and the like.

As shown, the clients 470 will convey network-based services requests to and receive responses from service provider network 400 via network 460. In various embodiments, network 460 may encompass any suitable combination of networking hardware and protocols necessary to establish network-based communications between clients 470 and service provider network 400. For example, network 460 may generally encompass the various telecommunications networks and service providers that collectively implement the Internet. Network 460 may also include private networks such as local area networks (LANs) or wide area networks (WANs) as well as public or private radio or wireless networks. For example, a given client 470 and service provider network 400 may be respectively provisioned within enterprises having their own internal networks. In such an embodiment, network 460 may include the hardware (e.g., modems, routers, switches, load balancers, proxy servers, etc.) and software (e.g., protocol stacks, accounting software, firewall/security software, etc.) necessary to establish a networking link between given client 470 and the Internet as well as between the Internet and service provider network 400. It is noted that in some embodiments, clients 470 may communicate with service provider network 400 using a private network rather than the public Internet.

Figure 5:
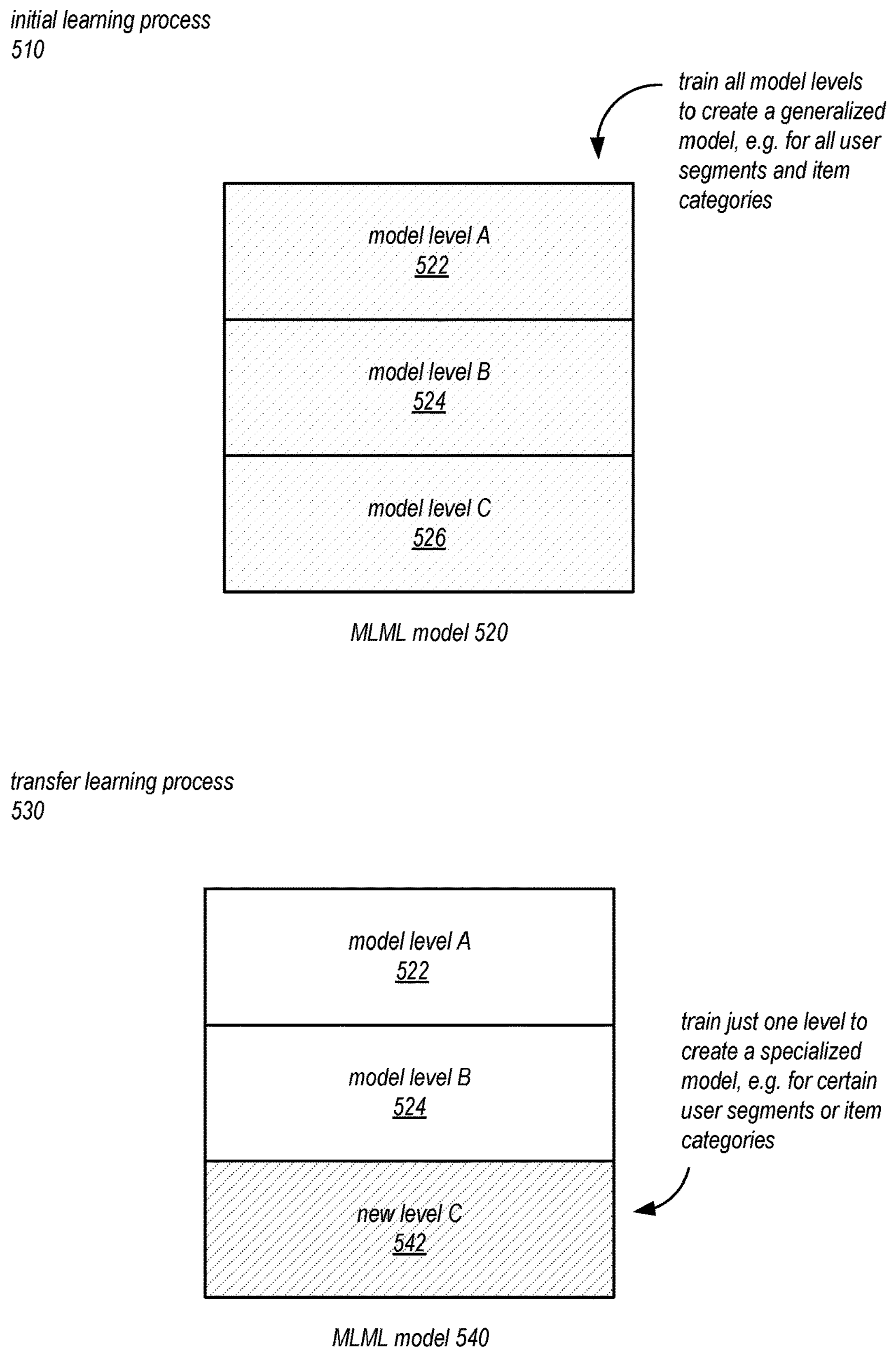
FIG. 5 illustrates a transfer learning technique for adapting a MLML model trained for one inference task to perform a different inference task, according to some embodiments.

FIG. 5 illustrates a transfer learning technique for adapting a MLML model trained for one inference task to perform a different inference task, according to some embodiments.

As shown, the top portion of the figure depicts an initial learning process 510, where an MLML model 520 with three levels 522, 524, and 526 is trained. In this initial learning process, all three levels are trained together, that is, the backpropagation phase of each training cycle will update parameters in each of the three levels. In this example, this initial training is used to create a generalized model 520 that can be used to make inferences globally for all user segments and item categories.

As shown, the bottom portion of the figure shows a transfer learning process 530, where a new MLML model 540 is trained to perform a transfer task, to generate specialized inference output for just a particular set of user segments or item categories. In this example, the transfer learning process 530 only trains one level of the model (new level C 542), so that the top two levels 522 and 524 are not updated by the training. Because only one level of the model is updated by the training, the training process can be completed much more quickly, and using less training data and resources.

In the context of an ad network, this transfer learning process 530 may be used to quickly create customized models for individual advertisers, even when the advertiser has a relatively low budget for model training or only sparse training data. For example, an advertiser may use this process to reuse a previous model level trained for a general population of all users, but create its own specialized model level for a category of niche products. Advantageously, the multi-level model architecture described herein decomposes the MLML model into a set of easily composable sub-models, so that the sub-models can be individually reused in later MLML models, based on the desires of advertisers. In some embodiments, the ad network management system may make certain trained model levels publicly accessible for incorporation into later models of advertisers that also employ the multi-level architecture.

Figure 6:
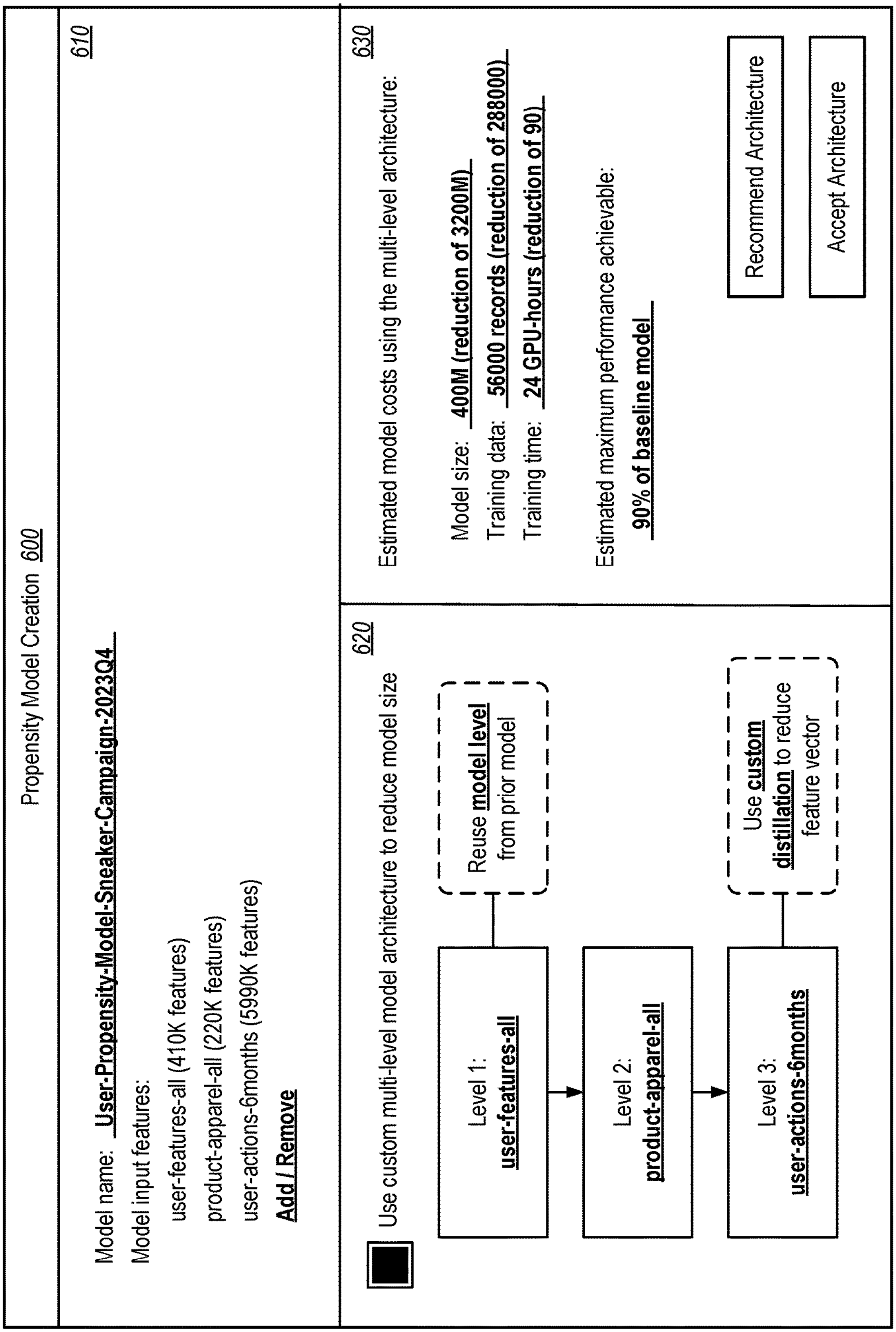
FIG. 6 illustrates an example user interface that allows users to configure the multi-level architecture design of a MLML model, according to some embodiments.

FIG. 6 illustrates an example user interface that allows users to configure the multi-level architecture design of a MLML model 100, according to some embodiments. The GUI 600 shown in the figure may be implemented as part of the campaign management interface 410 of FIG. 4.

As shown, the GUI 600 is configured to receive user input for defining the model architecture of a user propensity model. The top portion 610 allows the user to specify a model name of the model, as well as select the input feature sets for the model. The feature sets may correspond to data provided by the ad network service provider, or a private dataset of the advertiser.

The left portion 620 of the GUI provides a graphical visualization of a current configuration of the multi-level model architecture of the model. As shown in this example, the GUI allows the user to choose the option to use a multi-level model architecture to reduce the model size. The GUI may provide user controls to configure aspects of the model architecture, such as to specify the number of levels used, the ordering of the levels, and the assignment of feature sets to the levels. Additionally, the GUI here allows the user to specify to reuse previously trained model level, as well as to define a custom distillation process to reduce the size of an input feature vector (e.g. using the process discussed in connection with FIG. 3).

In some embodiments, the GUI may allow the users to perform other feature engineering tasks associated with the model, such as to filter a feature set for individual input features, define aggregation of raw features in the feature sets, or break up a single feature set into subsets so that the subsets can be assigned to different model levels. For example, the behavior feature vector 112, which tends to be the largest feature set, can be broken up into sub-vectors based on distinct product classes or time ranges (e.g. within last month or longer term).

In the right portion 630, the GUI provides a number of cost estimates of the MLML model, given the current model architecture. These estimates may be generated based on rules (e.g. rules used by the system to create the model), statistical data about previous models created by other users, or in some cases, machine learning models trained to generate such information. As shown, the cost parameters here include the estimated model size, the estimated amount of training data needed to reach a satisfactory model performance level, and the estimated amount of training time and resources needed for the training. In some embodiments, training and execution of the model may be outsourced to an external machine learning service (e.g. machine learning service 440), and such a service may provide these estimates in terms of resource usage fees. As shown, in this example, the estimated cost metrics are shown along with a savings amount that indicates how much the cost is reduced compared to a baseline model architecture that does not use multiple model levels to process different input features.

As shown, the GUI also provides a model performance estimate of the model's maximum achievable performance based on the current architecture. As may be appreciated, the model performance may decrease based on the model architectural choices of the user, for example, when the model is reduced in size, more model levels are added to the model, or fewer input features are used. The performance estimate thus allows the user to arrive at an informed tradeoff balance between model costs and model performance.

As shown, the user may choose to accept the model architecture or receive a recommendation from the system regarding the model architecture. A model recommendation may be generated by the system according to a set of cost or performance constraints of the model, which may be specified by the user in the same form as the cost and performance estimates shown on GUI 600. In some embodiments, the recommendation may be generated by other machine learning models, based on the user-specified constraints and other types of contextual data. A recommendation may include adding or removing one or more model levels, rearranging the way that the input feature sets are assigned to the levels, and performing other types of configuration changes that can be made manually via the GUI 600.

Figure 7:
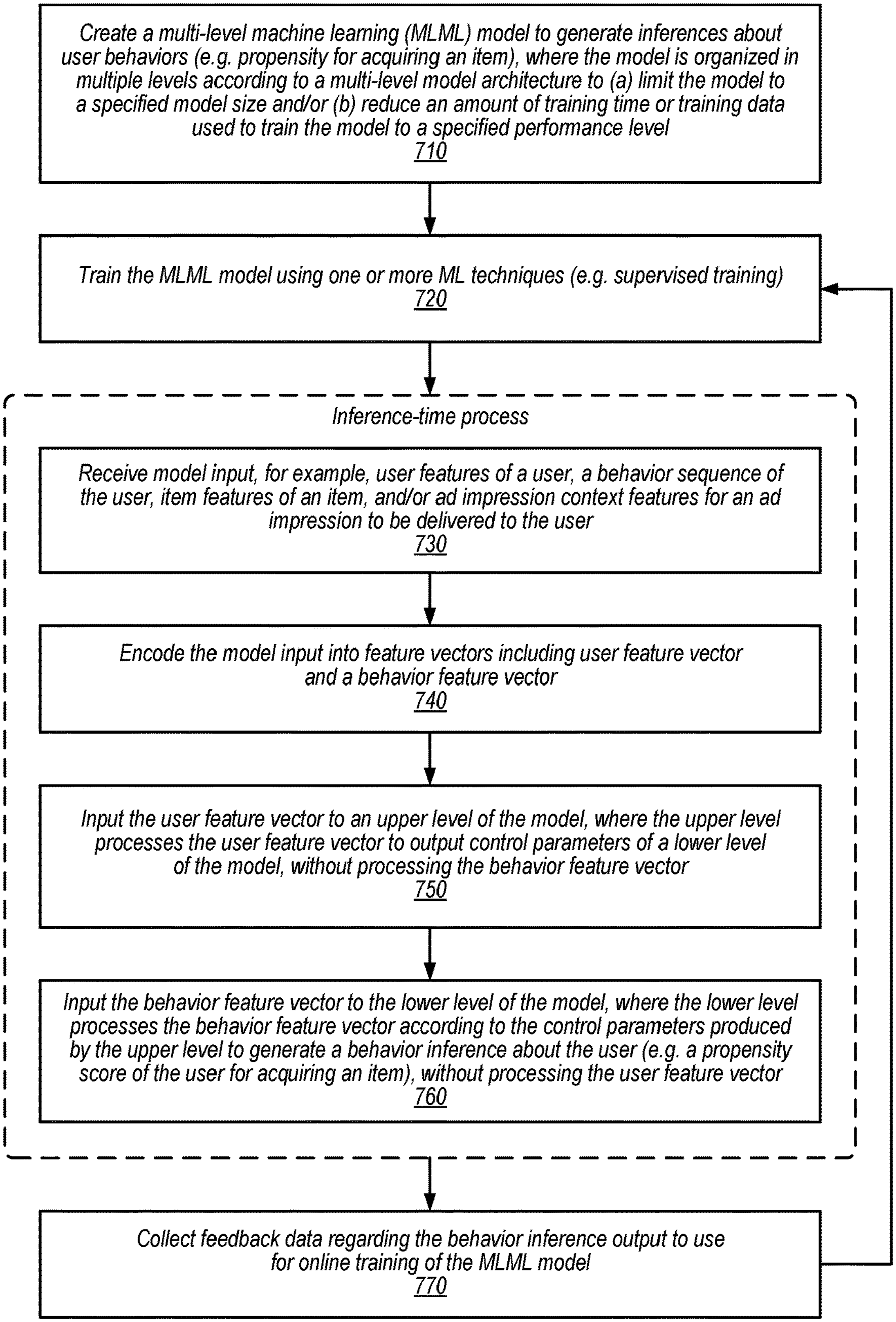
FIG. 7 is a flowchart illustrating a process of creating, training, and executing a MLML model to perform user behavior inference, according to some embodiments.

FIG. 7 is a flowchart illustrating a process of creating, training, and executing a MLML model (e.g. MLML model 100 or 240) to perform user behavior inference, according to some embodiments. The depicted method may be performed by a user behavior inference system, which may be implemented as a part of an ad network that uses the MLML model to select target audiences for ads.

The process begins at operation 710, where the MLML model is created. The MLML model may be created, for example via a model creation GUI 600, to generate inferences about user behaviors (e.g. user propensity 260 for acquiring an item). The MLML model is organized in multiple levels (e.g. upper level 120 and lower level 122) according to a multi-level model architecture, in order to (a) limit the model to a specified model size and/or (b) reduce an amount of training time or training data used to train the model to a specified performance level. In some embodiments the model size and training requirements may be specified as design constraints of the model, the model creation system may recommend the multilevel model architecture or automatically create the model according to the model architecture.

At operation 720, the MLML model is trained using one or more ML techniques. The training techniques may involve supervised training, where the observation records in the training dataset are labeled with known outcomes to be learned by the model. During training, the model generates its inference output based on an observation record and the output is compared to the truth label of the observation record. The difference between the generated output and the truth label is then used to calculate a loss, and the loss (e.g. the rate of change in the loss) is used to update the model parameters in a backpropagation step of the training process. In some embodiments, the MLML model may be a neural network whose individual neuron units implement ReLU activation functions.

As shown, operations 730 to 760 are executed as part of an inference-time process, which occurs after the MLML model has been trained. In some embodiments, the inference-time process does not train the model or update the model parameters. At operation 730, model input is received for the model to generate an inference output. The model input may include user features of a user, a behavior sequence of the user, item features of an item, and/or ad impression context features for an ad impression to be delivered to the user. The input data is discussed in more detail in connection with FIG. 2, and can include data collected by the ad network management system.

At operation 740, the model input data is encoded into input feature vectors for the model. These feature vectors include a user feature vector (e.g. user feature vector 110) and a behavior feature vector (e.g. behavior feature vector 112). In some embodiments, the input feature vectors may also include an item feature vector (e.g. item feature vector 330) and an ad impression context feature vector (e.g. context feature vector 232). Each of these feature vectors may be generated by an encoder (e.g. encoder 220*a-d*), which may be machine learning models (e.g. neural networks) trained to generate such feature vectors for downstream machine learning applications. In some embodiments, the behavior feature vector may be generated via a distillation process (e.g distillation process 350), where some user actions in the sequence are dropped. The retained actions may be actions associated with a distilled list of representative items. As a result of the distillation, the behavior feature vector can be drastically reduced in size.

At operation 750, a user feature vector is provided as input to an upper level of the model. The upper level processes the user feature vector to output control parameters (e.g. control parameters 140) for a lower level of the model. The upper level generates its output without processing the behavior feature vector. In some embodiments, the control parameters generated by the upper level includes connection weights that are applied to node-to-node connections in the lower level.

At operation 760, the behavior feature vector is provided as input to the lower level of the model. The lower level processes the behavior feature vector according to the control parameters generated by the upper level, to output a behavior inference about the user. The lower generates its output without processing the user feature vector. In some embodiments, the output of the lower level, which may be the output of the MLML model, is a propensity score that indicates a propensity of the user for acquiring an item. As discussed previously, by separating the two input feature vectors to be processed by two distinct levels of the model in this manner, the overall size of the model can be drastically reduced. Accordingly, less time, data, and resources are needed to train the model.

At operation 770, feedback data (e.g. feedback data 454) is collected regarding the behavior inference output, which is then used to perform online training of the MLML model. Such feedback data may include, for example, conversion results observed as the result of ad impressions delivered by the ad network. These conversion results may be used as truth labels for additional training data to gradually tune the model as it operates on live production data. As shown, the process loops back to operation 720, where additional training is performed. In some embodiments, the model may be deployed for a learning period, and then promoted to a decision-making status when its performance reaches a satisfactory level (e.g. when its selected target audience is generating a sufficiently high amount of conversions). In some embodiments, such online training may be turned on and off based on fluctuations in the model's observed performance.

Figure 8:
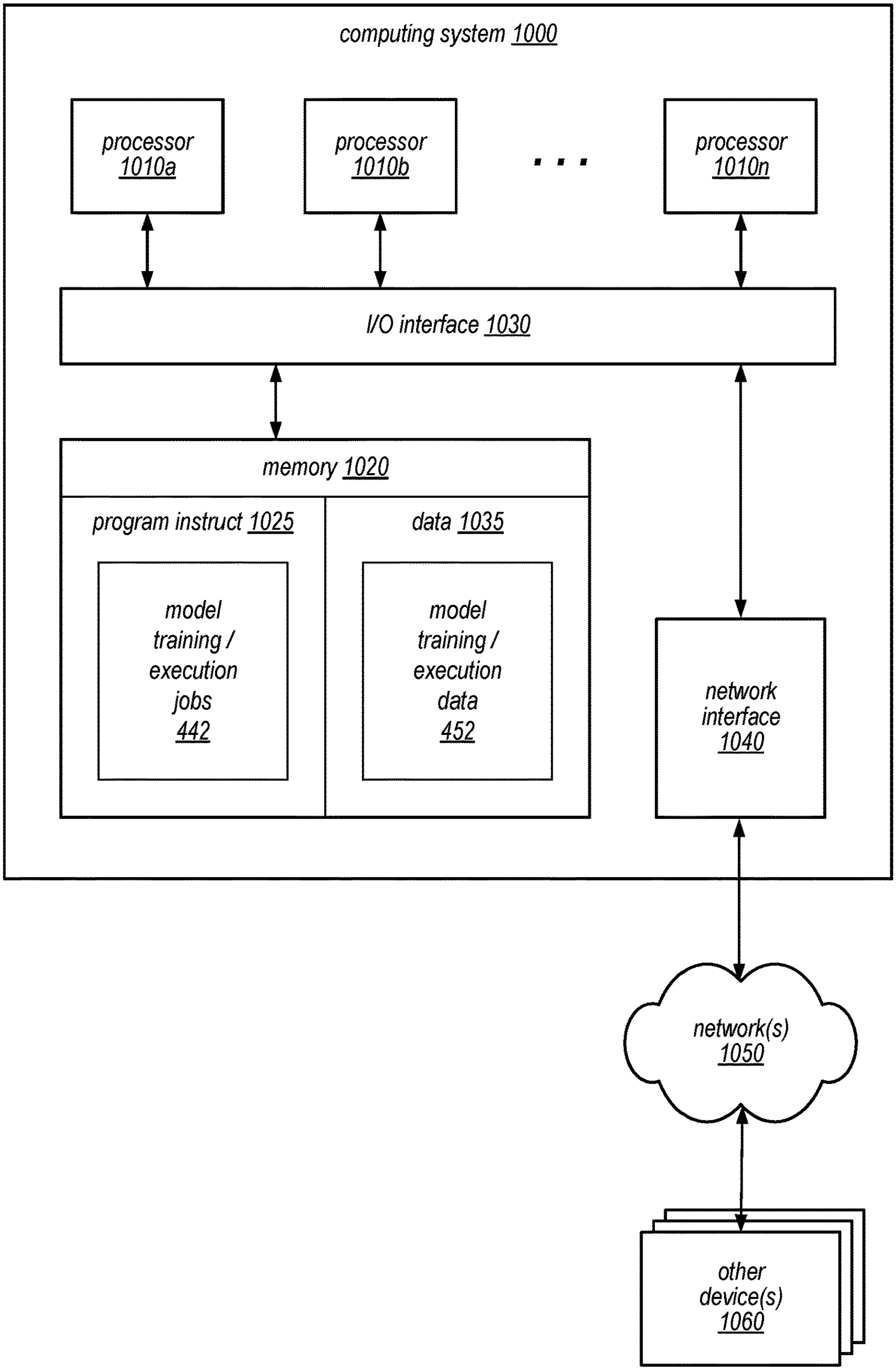
FIG. 8 is a block diagram illustrating an example computer system that can be used to train and execute a MLML model, according to some embodiments.

FIG. 8 is a block diagram illustrating an example computer system that can be used to train and execute a MLML model (e.g. to carry out the process of FIG. 7), according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement model training or execution jobs 442 for the MLML model. As shown, in some embodiments, the data memory 1035 may be used to store data such as the model training or execution data for the MLML model.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

one or more computer devices that implement a user behavior inference system, configured to:

execute a multi-level machine learning (MLML) model trained using one or more ML techniques to generate inferences about user behaviors, wherein the MLML model is organized in multiple levels according to a multi-level model architecture that includes an upper level and a lower level;

receive (a) a user feature vector encoding user features of a user and (b) a behavior feature vector encoding a behavior sequence of the user;

input the user feature vector to the upper level of the MLML model, wherein the upper level processes the user feature vector to output control parameters of the lower level without processing the behavior feature vector;

input the behavior feature vector to the lower level of the MLML model, wherein the lower level of the MLML model processes the behavior feature vector according to the control parameters produced by the upper level of the MLML model based on the user feature vector, to generate a behavior inference about the user; and wherein the multi-level model architecture (a) limits the MLML model to a specified model size and (b) reduces an amount of training time or training data used to train the MLML model to a specified performance level.

2. The system of claim 1, wherein:

the user behavior inference system is implemented as part of an ad network configured to deliver ads about different items to user devices;

the MLML model is trained to output propensity scores of different users for acquiring different items;

input to the upper level of the MLML model includes an item feature vector that encodes features of an item; and the MLML model outputs a propensity score of the user for acquiring the item, wherein the propensity score is used by the ad network to select an audience for an ad about the item.

3. The system of claim 2, wherein:

the input to the upper level of the MLML model includes a context feature vector that encodes features of an ad impression context associated with an impression associated with the ad; and the ad impression context includes information that indicates one or more of:

a time of the ad impression, a type of a user device associated with the ad impression, a location of the user device at the time of the ad impression, a content category or webpage used to deliver the ad impression, a placement of the ad impression within a content or webpage, a media type of the ad impression, or a user action related to a previous ad impression.

4. The system of claim 2, wherein:

the ad network is configured to deliver ads for a plurality of advertiser clients;

the MLML model is created for a particular advertiser client according to configuration input specified by the particular advertiser client;

the ad network is managed by resources of a multi-tenant infrastructure provider network; and the MLML model is managed by a machine learning service of the multi-tenant infrastructure provider network.

5. The system of claim 1, wherein:

the MLML model is a neural network;

the upper level is a one-hidden layer neural network; and the lower level is a two-hidden layer neural network.

6. A method, comprising:

performing, by a user behavior inference system implemented by one or more computer devices:

executing a multi-level machine learning (MLML) model trained using one or more ML techniques to generate inferences about user behaviors, wherein the MLML model is organized in multiple levels according to a multi-level model architecture that includes an upper level and a lower level;

receiving (a) a user feature vector encoding user features of a user and (b) a behavior feature vector encoding a behavior sequence of the user;

inputting the user feature vector to the upper level of the MLML model, wherein the upper level processes the user feature vector to output operating parameters of the lower level without processing the behavior feature vector; and inputting the behavior feature vector to the lower level of the MLML model, wherein the lower level of the MLML model processes the behavior feature vector according to the control parameters produced by the upper level of the MLML model based on the user feature vector, to generate a behavior inference about the user.

7. The method of claim 6, wherein:

the behavior inference includes a propensity score of the user for acquiring an item; and the method further comprises selecting an audience for an ad about the item based on a plurality of propensity scores generated by the MLML model.

8. The method of claim 7, further comprising:

encoding features of the item in an item feature vector, wherein the item feature vector is input to the upper level of the MLML model.

9. The method of claim 8, wherein:

the behavior feature vector encodes a plurality of user actions of the user with respect to different items; and the behavior feature vector includes item feature vectors of the different items.

10. The method of claim 6, wherein:

the MLML model is a neural network;

the upper level is a one-hidden layer neural network; and the lower level is a two-hidden layer neural network.

11. The method of claim 6, wherein:

the lower level is a neural network of neuron units connected by a plurality of unit-to-unit connections; and the control parameters produced by the upper level include weights that are applied to individual ones of the unit-to-unit connections.

12. The method of claim 6, wherein:

the behavior sequence of the user includes user actions associated with a plurality of items; and the method further comprises performing a distillation process on the behavior sequence to reduce the behavior sequence to user actions associated with a reduced set of the items, wherein the distillation process reduces a size of the behavior feature vector used to encode the behavior sequence.

13. The method of claim 12, wherein:

the behavior feature vector includes item encodings of items associated with individual user actions; and the distillation process reduces a size of the item encodings in the behavior feature vector.

14. The method of claim 6, further comprising:

training the upper and lower levels of the MLML model together for one category of users or items; and performing a transfer learning process to train the MLML model for a second category of users or items, wherein the transfer learning process trains only one of the upper or lower level.

15. The method of claim 6, further comprising:

receiving model configuration input for a new model via configuration interface of the user behavior inference system, wherein the configuration input specifies to create the new model using the multi-level model architecture; and creating the MLML model according to the configuration input.

16. The method of claim 15, wherein the configuration input specifies a number of levels in the MLML model or an assignment of input feature vectors to different ones of the levels.

17. The method of claim 15, wherein the configuration interface indicates:

an estimated model cost associated with training or using the MLML model using the multi-level model architecture; and an estimated savings in the model cost achieved based on use of the multi-level model architecture.

18. One or more non-transitory computer-accessible storage media storing program instructions that when executed on one or more processors of user behavior inference system, cause the user behavior inference system to:

execute a multi-level machine learning (MLML) model trained using one or more ML techniques to generate inferences about user behaviors, wherein the MLML model is organized in multiple levels according to a multi-level model architecture that includes an upper level and a lower level;

receive (a) a user feature vector encoding user features of a user and (b) a behavior feature vector encoding a behavior sequence of the user;

input the user feature vector to the upper level of the MLML model, wherein the upper level processes the user feature vector to output control parameters of the lower level without processing the behavior feature vector; and input the behavior feature vector to the lower level of the MLML model, wherein the lower level of the MLML model processes the behavior feature vector according to the control parameters produced by the upper level of the MLML model based on the user feature vector, to generate a behavior inference about the user.

19. The non-transitory computer-accessible storage media of claim 18, wherein:

the behavior inference includes a propensity score of the user for acquiring an item; and a plurality of propensity scores generated by the MLML model are used to select an audience for an ad about the item.

20. The non-transitory computer-accessible storage media of claim 19, wherein the program instructions when executed on the one or more processors cause the user behavior inference system to input an item feature vector to the MLML model that encodes features of the item.

* * * * *